United States Patent
Cavarec et al.

(10) Patent No.: US 8,972,030 B2
(45) Date of Patent: Mar. 3, 2015

(54) CONTROL DEVICE COMPRISING AN INTERFACE CAPABLE OF PROPOSING THE NEXT CONTROL COMMAND TO BE TRANSMITTED TO A HOME-AUTOMATION APPLIANCE

(75) Inventors: Pierre-Emmanuel Cavarec, Mont Saxonnex (FR); Pierre Mignot, Chateauroux les Alps (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 13/407,276

(22) Filed: Feb. 28, 2012

(65) Prior Publication Data
US 2012/0253483 A1    Oct. 4, 2012

(30) Foreign Application Priority Data

Feb. 28, 2011    (FR) ...................................... 11 51589

(51) Int. Cl.
| G05B 11/01 | (2006.01) |
| G05B 15/00 | (2006.01) |
| G08C 17/02 | (2006.01) |
| H04L 12/28 | (2006.01) |

(52) U.S. Cl.
CPC ............ *G08C 17/02* (2013.01); *H04L 12/2814* (2013.01); *H04L 12/282* (2013.01); *H04L 2012/2841* (2013.01)
USPC ............................................. 700/17; 700/83

(58) Field of Classification Search
USPC ..................................................... 700/17, 83
See application file for complete search history.

(56) References Cited

U.S. PATENT DOCUMENTS

| 5,086,385 | A | * | 2/1992 | Launey et al. ................... 700/83 |
| 5,579,221 | A | * | 11/1996 | Mun ................................. 700/83 |
| 6,192,282 | B1 | * | 2/2001 | Smith et al. ..................... 700/19 |
| 6,400,280 | B1 | * | 6/2002 | Osakabe ....................... 340/4.41 |
| 6,756,998 | B1 | * | 6/2004 | Bilger ............................ 715/764 |
| 6,938,101 | B2 | * | 8/2005 | Hayes et al. ....................... 710/5 |
| 6,967,565 | B2 | * | 11/2005 | Lingemann ................. 340/12.23 |
| 7,005,979 | B2 | * | 2/2006 | Haughawout et al. ...... 340/539.1 |
| 7,092,772 | B2 | * | 8/2006 | Murray et al. ................... 700/83 |
| 7,345,593 | B2 | * | 3/2008 | Park et al. ..................... 340/4.37 |
| 7,831,321 | B2 | * | 11/2010 | Ebrom et al. ................... 700/87 |
| 7,831,930 | B2 | * | 11/2010 | Dresti et al. ................... 715/835 |
| 7,844,353 | B2 | * | 11/2010 | Bejean et al. ................... 700/83 |
| 7,895,532 | B2 | * | 2/2011 | Scott et al. .................... 715/810 |
| 8,543,244 | B2 | * | 9/2013 | Keeling et al. ................ 700/276 |

(Continued)

FOREIGN PATENT DOCUMENTS

EP    1783716 A    5/2007

OTHER PUBLICATIONS

Review: Roky Digital Video (Netflix and Amazon) Player; by Paul Stamatiou, originally published (as evidenced by WayBack Machine) May 10, 2009; printed from Internet on Mar. 20, 2013; 21 pages.*
Poku Adds Channels, Third Party Remote Apps; by Ryan Lawler; published on Feb. 10, 2010;; printed from Internet on Mar. 20, 2013; 4 pages.*

(Continued)

*Primary Examiner* — Ronald Hartman, Jr.
(74) *Attorney, Agent, or Firm* — Frommer Lawrence & Haug LLP; Ronald R. Santucci (57) ABSTRACT

Method of operation of a control device for a home-automation appliance, wherein the method comprises at least one step of selecting a possible control command from among a plurality of predefined control commands, that may be sent by the control device and at least one step of displaying the command selected by this control device.

21 Claims, 7 Drawing Sheets

(56) References Cited

U.S. PATENT DOCUMENTS

| | | |
|---|---|---|
| 2004/0268391 A1 | 12/2004 | Clercq et al. |
| 2005/0219210 A1* | 10/2005 | Leland et al. ............... 345/157 |
| 2006/0050142 A1 | 3/2006 | Scott et al. |
| 2006/0150120 A1* | 7/2006 | Dresti et al. ............... 715/810 |
| 2006/0161856 A1* | 7/2006 | Heir ............................ 715/769 |
| 2012/0254357 A1* | 10/2012 | Kawakami et al. .......... 709/217 |

OTHER PUBLICATIONS

10 Tips for Getting the Most Out of Your Roku; by Janko Roettgers; published on Dec. 17, 2010; printed from Internet on Mar. 20, 2013; 7 pages.*

Search Report issued by French Patent Office for priority application FR 1151589 dated June 28, 2011.

* cited by examiner

CONTROL DEVICE COMPRISING AN INTERFACE CAPABLE OF PROPOSING THE NEXT CONTROL COMMAND TO BE TRANSMITTED TO A HOME-AUTOMATION APPLIANCE

CROSS-REFERENCE TO RELATED APPLICATIONS

The present application claims the benefit of foreign priority to French Patent Application No. 1151589 filed Feb. 28, 2011, the entirety of which is incorporated by reference hereby

FIELD

The invention relates to a control device intended to be used within a home-automation installation comprising at least one home-automation appliance, the control device being able to communicate with at least one home-automation appliance of the installation so as to transmit control commands to it. The invention also relates to a method of operation of such a control device. The invention further relates to a home-automation installation comprising such a home-automation device.

Such control devices may be for example used to control the movements of mobile elements of a building such as shutters, roller blinds, doors or gates controlled by electromechanical actuators.

Hereinafter in this document, it will be possible to use the term "remote control" to designate a wireless control device according to the invention.

However, the subject of this invention is not limited to wireless devices; a wired control device can equally well implement the method described in this document. Likewise, for wireless devices, and in a nonlimiting manner, the communication may be uni- or bidirectional, radio or infra red for example.

DESCRIPTION OF RELATED ART

Wireless remote controls for controlling home-automation appliances often comprise a limited number of control buttons making it possible to send control commands. In certain cases, these remote controls are nonetheless used to send various control commands to various appliances, a touch key possibly being associated with an appliance, this same key making it possible to send commands of various natures to the appliance concerned. The control commands transmitted may correspond to change-of-state commands: each control command, termed a sequential command, thus has a meaning which depends on the present state of the controlled home-automation appliance. Thus, for example, pressing a button of a remote control can give rise to an action of opening a roller blind if the latter is closed at present and give rise to an action of closing the roller blind if the latter is open at present. The problem in this case is that the user does not necessarily know which command will be sent and executed by the home-automation appliance, in particular if this involves a remote control without visibility of the mobile element.

Hereinafter in this document, the terms "instruction", "command" and "control command" are used interchangeably to designate the content of the information sent from the remote control to the home-automation appliance. These terms designate in particular the contents causing a movement of a mobile element of a home-automation appliance or an activation of a home-automation appliance or a deactivation of a home-automation appliance.

Let us take as another example a remote control with a single button, serving to control a garage door (press 1: up command if the garage door is not completely open, press 2: stop command if the door is moving, press 3: down command, press 4: stop command, etc.). If, for one reason or another, the movement is halted automatically (for example because the door encounters an obstacle) or if the user halts the movement of his garage door whilst it is currently closing (the door is moving, and pressing the control button halts this movement), for example because he realises that an obstacle will interfere with complete closure of his door, after he has cleared away the obstacle and wishes to finish closing his door, he will not necessarily know which control command will be sent by his remote control and could be surprised by the command sent; in this instance, for the example cited, this could be an up command since the command preceding the stop requested by the user was a down command (close). The result of pressing the button will therefore have a contrary effect to that desired by the user. On the other hand, this up command could have an effect that is appreciated by the user: the upward motion of the garage door could help the user to clear away the interfering obstacle. In certain situations this results in unnecessary activations of the door.

Known from document EP1783716 is a method of operation of a home-automation network proposing a step of information feedback on the part of the home-automation apparatuses controlled by a bidirectional remote control, the remote control being able to display the information received. This step allows the user to verify in particular how the command, for example a change-of-state command, sent by the remote control, has been interpreted.

Document US2006/50142 describes a universal remote control device comprising a touch screen whose display alters in tandem with the actions exerted on the screen to display the set of control keys making it possible to control each home-automation appliance, that is to say making it possible to display on the screen simultaneously all the control keys equivalent to those of the original remote control of the home-automation appliance.

Document US2004/268391 describes a remote control device in which it is possible to illuminate one or more keys so as to attract the user's attention to these keys and to the commands corresponding thereto.

SUMMARY

The aim of the invention is to provide a method of operation of a control device increasing the simplicity and the comfort of use and improving the methods known from the prior art. In particular, the invention proposes a simple and user-friendly method of operation allowing the user to avoid carrying out trial and error steps or steps of unnecessary activations of a home-automation appliance. The invention applies in particular to a remote control exhibiting small dimensions and on which a limited number of control buttons may be disposed. The invention also proposes a control device implementing such a method.

According to the invention, the method governs the operation of a control device of a home-automation appliance. It comprises at least one step of selecting a possible control command from among a plurality of predefined control commands, that may be sent by the control device and at least one step of displaying the command selected by this control device.

The control command selected and displayed by the control device may be the next command that the control device proposes to send to the home-automation appliance.

The selection of the command displayed by the control device may result from an analysis of the log of the previously sent commands or an analysis of the actual state of the home-automation appliance or a sequence of commands which is predefined by the user.

The method can comprise a step of modifying, according to a choice of the user, the command selected by the control device.

The modifying step can comprise a scrolling in a sequential manner of the plurality of the control commands that may be sent.

The method can comprise a step of validating and sending the control command selected.

The method can comprise a step of displaying a stop command subsequent to the step of validating and sending the control command selected.

According to the invention, the control device for a home-automation appliance comprises hardware means and processing means able to implement the above-defined method of operation.

The hardware means and processing means can comprise a means for selecting a control command and at least one display device intended to display a symbol representing the control command selected.

The hardware means and processing means can comprise a means for modifying the command selected.

The hardware means and processing means can comprise a means for sending the command selected.

One and the same key can comprise the display device and the modifying means, this same key being able, when it is activated, to trigger the sending of the control command.

A first key can comprise the display device and a second key can comprise at least one of the means for modifying or triggering the send of the control command.

The invention also relates to a data recording support readable by a calculator on which is recorded a computerized program comprising computerized program code means for implementing the phases and/or steps of the above-defined method.

The invention further relates to a computerized program comprising a computerized program code means adapted to the carrying out of the steps of the above-defined method, when the program runs on a computer or calculator.

BRIEF DESCRIPTION OF THE DRAWINGS

The invention will be better understood on reading the description which follows, given solely by way of example while referring to the appended drawings in which.

DETAILED DESCRIPTION OF THE EMBODIMENTS

Figure 1:
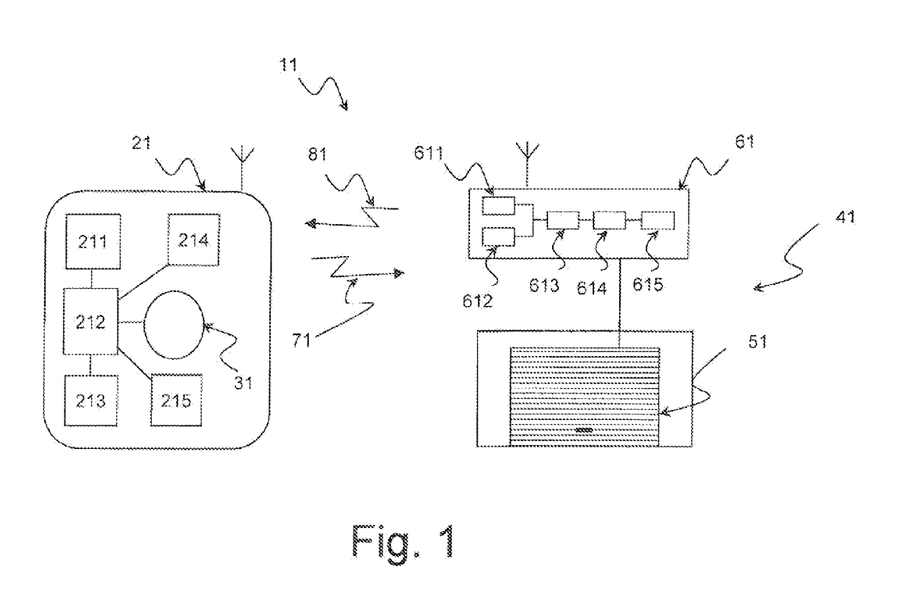
FIG. 1 is a diagram of an embodiment of a home-automation installation or network according to the invention.

An embodiment of a home-automation installation 11 or home-automation network, represented in FIG. 1, comprises a motorized garage door 41 and a first embodiment of a control device, such as a wireless remote control 21, the motorized garage door device and the wireless remote control communicating by way of electromagnetic signals 71 sent by the remote control 21 and of electromagnetic signals 81 sent by the motorized garage door device 41.

The motorized garage door device 41 comprises an actuator 61 which moves the door 51. The actuator 61 comprises an electric motor 615, means for sending 611 and for receiving 612 electromagnetic signals, a logic processing unit 613 and means 614 for controlling the power supply for the electric motor. The logic processing unit 613 comprises a microprocessor and means for processing the signal or software means making it possible to interpret a signal such as a control command received by the means for receiving signals. This interpretation makes it possible to generate motor control signals which are transmitted to the motor power supply control means.

The wireless remote control 21 comprises a power supply 213, a logic processing unit 212, means for receiving electromagnetic signals 211, means for sending electromagnetic signals 214, a memory 215 in which are stored the various commands which may be sent to the door actuator 61, and a man-machine interface 31 equipped with a display device (for example a screen or light-emitting diodes) able to display a symbol, representative of a type of command such as for example an upward pointing arrow to indicate an up command, a square to indicate a stop command, etc. The logic processing unit 212 comprises microprocessor.

The control device, in particular the logic processing unit, comprises hardware means and software or processing means rendering it able to define the priorities between the various control commands which may be sent to the door actuator 61 so as to choose the next control command to be proposed to the user. This command is displayed on the display device of the man-machine interface 31 before it is sent to the actuator 61. The priorities between the various possible control commands are determined for example as a function of the log of the previously sent commands, of the state of the actuator, of the diverse information received from the actuator, etc. The user could also configure a command sequence to be executed, or customize the reactions of his product as a function of its present state; for example, for a garage door having encountered an obstacle on the way down, and having stopped on this obstacle, the remote control will propose by default the sending of an up command for the next command to be sent, whereas the user might, in this typical case, prefer to routinely send a down command. The list of commands stored in the memory 215 is not frozen and can of course be updated during the life of the product with the aid of a specific tool, or of a more advanced remote control, or with the aid of any other means making it possible to enter into communication with the control device. This list of commands does not necessarily consist solely of simple commands, it could also contain scenarios making it possible to launch a succession of sendings of simple commands to at least one home-automation appliance of the installation; it would be possible for example to have a scenario "I am going out" which, once selected and launched, could ask the garage door to close, the alarm to set itself, the roller blinds to close, and the terrace shutter to fold away. Each scenario may be represented by a specific symbol (for example, the scenario "I am going out" could be symbolized by a padlock, a scenario "nightfall" by a moon). If a list of predefined scenarios may be proposed to the user, the latter also has the possibility of defining his own scenarios and of modifying those which are proposed to him by default.

The signals 71 sent with the aid of the means for sending electromagnetic signals 214 by the remote control comprise control commands for the motorized garage door device.

The signals 81 sent with the aid of the means for sending electromagnetic signals 611 by the motorized door device to the remote control can for example be information signals, relating for example to the interpretation of the control commands received. This information may be for example information regarding proper reception of the control command, or information regarding proper execution of this command, or conversely information regarding non-execution of this command, the reason for this non-execution possibly being specified in this information. These signals 81 may on the other hand convey information relating to the state of the door. Examples of states of the motorized door are for example: the door is completely open, the door is completely closed, the door is in an intermediate position, the door is opening, the door is closing, an obstacle has been detected, the movement of the door has been reversed, the actuator is in a normal mode of operation or the actuator is in an abnormal mode of operation. Other states may be envisaged.

Figure 2:
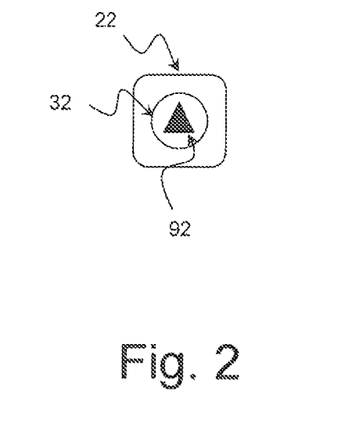
FIGS. 2 to 6 illustrate a few examples of possible embodiments of a control device according to the invention.

FIG. 2 illustrates a second embodiment of the control device 22, in which there exists just a single man-machine interface element 32 capable of displaying a symbol 92 representative of a control command proposed by the control device. Pressing the element 32 allows a validation, this validation causing the triggering of the sending of this command. This single element may also make it possible to modify the command proposed by virtue of specific actions related to the element 32, before validating and triggering the sending of the control command. To validate and send the proposed command, the user could for example undertake a "short" press (of a duration lasting less than 800 ms for example) of the element 32, and to modify this command he could for example undertake a "long" press (of a duration lasting more than 1.2 s for example) of the element 32, each "long" press making it possible to display a different command (the commands thus being able to scroll in a loop).

Figure 3:
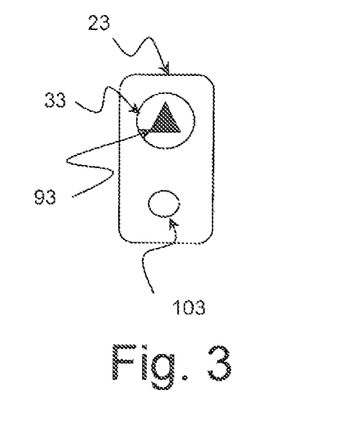

FIG. 3 illustrates a third embodiment of the control device 23. The latter comprises a first man-machine interface element 33 furnished with a display interface able to display a symbol 93 representative of the control command proposed and a second man-machine interface element 103. In a first variant embodiment, the element 33 serves solely as display of the control command proposed, and the element 103 allows the user, by an action on the latter, to modify this command and then to validate it. Validation automatically causes the sending of the command. The modification of the proposed command can be done for example by presses of short duration, and its validation by a longer press, or vice-versa.

Alternatively, the element 33 can serve as display and as means for validating and then sending the selected command, the element 103 making it possible solely to modify the command proposed by the control device.

Alternatively, the element 33 can serve as display and as means for modifying the proposed command, the element 103 making it possible solely to validate and then to send the selected command. In this case, the element 33 is also a key.

Figure 4:
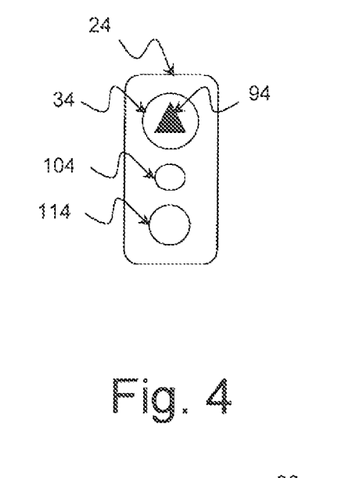

FIG. 4 illustrates a fourth embodiment 24. It comprises a first man-machine interface element 34 able to display a symbol 94 representative of the proposed command, a second man-machine interface element 114 making it possible to modify the proposed command and a third man-machine interface element 104 making it possible to trigger the sending of the selected command. The successive presses of the element 114 scroll the list of possible commands on the display element 34.

Figure 5:
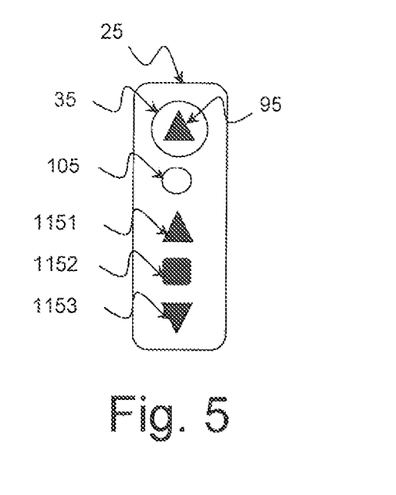

FIG. 5 illustrates a fifth embodiment 25. It comprises an element 35 for displaying a symbol 95 representative of the proposed command, man-machine interface elements 1151, 1152, 1153 making it possible to modify the proposed command, and a separate man-machine interface element 105 making it possible to trigger the sending of the selected command. If the command displayed on the display element 35 is not suitable, it suffices to select the desired command directly with the aid of the elements 1151, 1152 and 1153. This embodiment exhibits particular benefit if, as a function of the duration of the presses of the keys 1151, 1152 and 1153, or as a function of particular actions of use of these keys (successive presses for example), commands of different natures are sent. For example, a short press on the key 1152 will select a stop command whereas a long press will select the command "go to predefined position 1", a short press on the key 1151 will select an up command whereas a long press will select the command "go to predefined position 2", etc. Selection of the various commands is facilitated.

Figure 6:
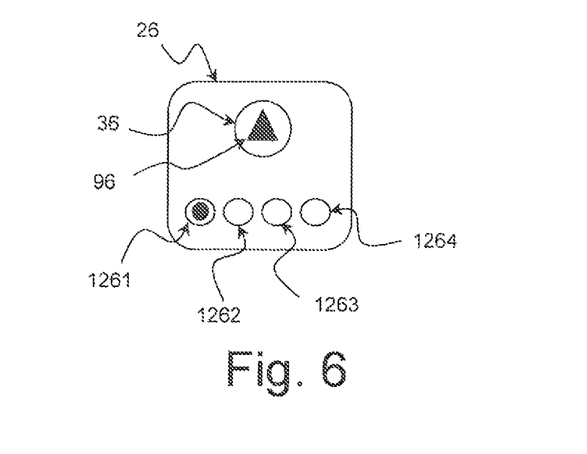

FIG. 6 illustrates a sixth embodiment 26. This device is a variant of that described in FIG. 2. The element 36 is able to carry out the same functions as the element 32. The difference resides in the fact that the device 26 is able to control various appliances and the selection of the appliance that the user desires to control is made with the aid of the selection elements 1261, 1262, 1263, and 1264; when the user has acted on the element 1261, as illustrated in the figure, the device will control a first appliance, if he has acted on the element 1262, it will control a second appliance and so on and so forth.

It may be noted that the list of possible commands may differ from one appliance to the other. For example, if the first appliance is of garage door or roller blind type, the list of possible commands could comprise up or open, stop, down or close commands. If the second appliance is of Venetian blind type, the list of possible commands could comprise the following commands: up, stop, tilting of the slats, down. Another appliance could be a gate for which the list of possible commands could comprise a partial open command, a total open command, a close command, etc.

Note that the devices 23, 24 and 25 could also exhibit this type of selection interface so as to control several appliances.

The set of elements 32, 33, 34, 35, 36, as well as all the other elements of "button" type represented in FIGS. 2 to 6 may be of "touch" technology. They can thus be virtual keys, or may be mounted on a mobile mechanical button.

In all typical cases, at least one of the elements may be enriched with a capacitive type sensor for example, capable of detecting the approach of the user's hand thereby making it possible to awaken the control device and to display the command only at the moment when the user is getting ready to actually use his remote control. Alternatively, in another embodiment, for example when the remote control is not equipped with means for detecting the approach of the user's hand, pressing any one of the keys of the control device will be able to awaken the device from standby. Preferably, this press will have no function other than the wakeup function.

Alternatively, in another embodiment, for example when the man-machine interface of the control point uses a technology, for example of electronic paper (e-paper) or electronic ink, consuming energy only when it changes state, the display is permanent, and it is not necessary for the control point to be woken up/sent to sleep.

Alternatively, in another embodiment, the control point can be woken up by simply taking it in one's hand or by a shaking movement or by any other specific movement of the control point; selection of the commands in the list can also be done in this way (each shake of the control point causes the selection of a new command from the list).

In all typical cases, the symbol representative of the control command that is displayed on the control point may be enriched with any other symbol, such as for example with a symbol representative of the impact that the proposed command will have, if it is selected and sent to the home-automation appliance, on the overall energy consumption of the house. For example, if the outside temperature is relatively low, and if the user selects an command to open a window, it will be possible to display, in addition to the open symbol, a symbol indicating that if this opening is confirmed, it will cause extra energy consumption. It would be possible to contemplate a score corresponding to the impact of a command on this consumption (this score could be symbolized by 1 to 3 green stars to quantify any energy saving, and by 1 to 3 red stars to quantify an energy wastage for example).

The control device comprises hardware means and/or software or processing means making it possible to govern its operation in accordance with the method which is the subject of the invention, in particular to govern the steps of this method and the way they are strung together. The hardware means comprise the logic processing unit. The processing means may be contained in the logic processing unit. The processing means may in particular comprise a computerized program code means adapted to the carrying out of the steps of the method according to the invention, when the program runs on a computer. The processing means comprise the means for selecting a possible control command from among a plurality of control commands that are predefined and that may be sent by the control device.

Figure 7:
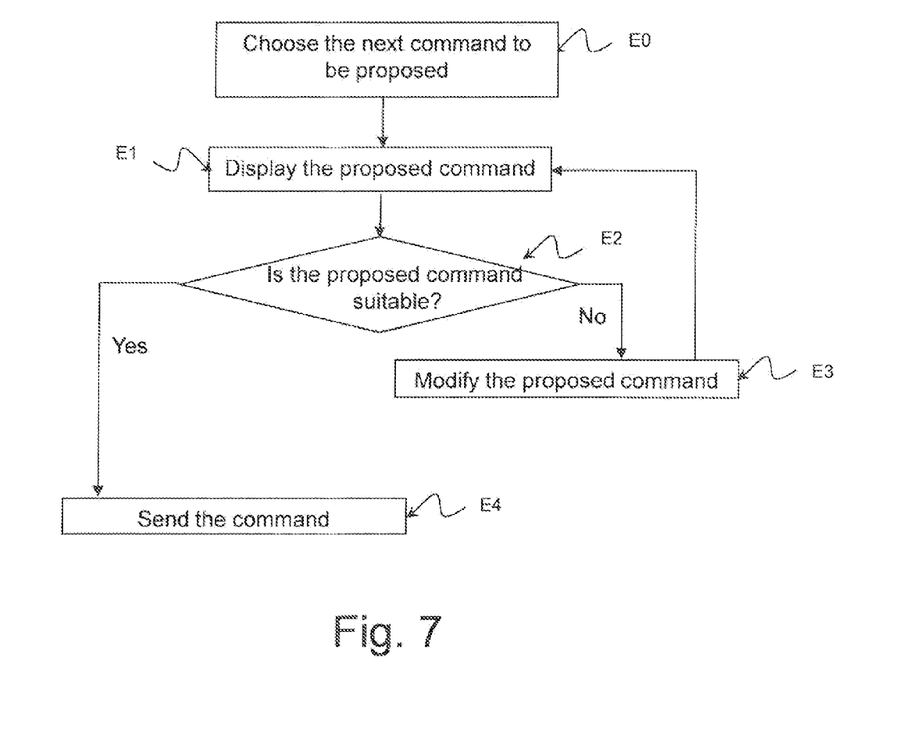
FIG. 7 is a flowchart of a first mode of execution of the method of operation according to the invention.

FIG. 7 is a flowchart illustrating the main steps of implementation of a first mode of execution of the method of operation according to the invention.

Preferably, when it is unused, a self-powered control device, that is to say one having its own energy source, is in a standby state. Hence, a wakeup step must be implemented to terminate this standby state. This optional step is not represented and corresponds to the switch from the standby state of the remote control to a normal operating state with an optimum power supply. For a wire-based control device, that is to say one which is linked to the electrical power supply network of the building, the same holds. This wakeup step may be carried out in various ways, as described hereinabove.

Once the remote control has been woken up, it implements a step of choosing or selecting the next control command to be proposed in a step E0.

This choosing may be done in various ways, it may for example be based on:
a log of the previously sent controls,
and/or the actual state of the actuator, this being possible for bidirectional remote controls; accordingly, the remote control, as soon as it is woken up, can send an interrogation command to the actuator so as to ascertain its actual state,
and/or a certain amount of information sent by the actuator to the remote control (possible for bidirectional remote controls only).
and/or statistics of use of the system over time
and/or a configuration previously defined by the user.

In a second step E1, the control device displays the control command chosen by the control device. This control command is proposed to the user for the next send of a command, doing so for a predefined time D0 not represented in the figure. Without any action on the part of the user during this time D0, the control device can automatically return to the standby state.

In a third step E2, the control device determines whether the control command proposed suits the user. Accordingly, the control device analyses an action by the user. If the control command is suitable, a step E4 in which the control command is sent is proceeded to directly. Otherwise, in a step E3, the control device modifies the control command proposed as a function of the user's actions. Each time that the user modifies the proposed command, the symbol corresponding to the modified command is displayed, that is to say step E1 is looped over.

It was seen in the description of FIGS. 2, 3, 4, 5 and 6 hereinabove, that this modification could be carried out in various ways. During step E4, the selected command is validated and then sent to the home-automation appliance with which the remote control is able to communicate, the sending being able to be done in various ways (communication by electromagnetic waves, infrared, by wire-based link, etc.). The controlled home-automation appliance can then initiate its action (for example of movement).

Subsequent to step E4 of sending the selected command, a first option consists in sending the remote control to sleep and in returning it directly to its standby state.

Another option, possible for a bidirectional control device, consists in implementing a second mode of execution of the method of operation described hereinafter with reference to the flowchart of FIG. 8. This second mode of execution comprises steps E5 to E9 of FIG. 8 in addition to the steps of FIG. 7.

Once the selected command has been sent, the nature of this command is determined in a step E5. If it is not a movement command, it is possible to proceed directly to a step E8 in which the device chooses the next control command to be proposed to the user. If it is a movement command, a step E6 is proceeded to, in which the control device chooses and displays, throughout the duration of the movement, a stop command so that, in case of emergency, the user can validate and send this command rapidly. The user does of course have the possibility of modifying this stop command and of choosing any other control command from the list of possible commands. If the user decides to send the proposed stop command or any other command of his choice, then step E4 of sending the command is returned to. Otherwise, once the movement has terminated, step E8 is proceeded to. Step E8 consists in choosing the next control command that the device will propose to send to the home-automation appliance, as in step E0. This new command may remain displayed on the display device for a predetermined duration D1 (step E9), this duration D1 possibly being parametrizable, before the control device places itself back on standby, this being so that the user can send this command fairly rapidly and restart the procedure directly at step E4, without going via the wakeup step.

For the duration D1, the user has of course the possibility of modifying the proposed command.

Another option could toggle the device directly from step E4 of sending the command to step E8 of choosing the next command to be proposed, and then to step E9 of temporary display of this new command. However, it seems more beneficial to propose a stop command for the duration of the movement, as described above.

For a unidirectional control device, another option consists in implementing a third mode of execution of the method of operation described hereinafter with reference to the flowchart of FIG. 9. This third mode of execution comprises steps E10 to E13 of FIG. 9 in addition to the steps of FIG. 7. The unidirectional control device has no knowledge of the state of the controlled appliance, subsequent to the sending of the command carried out in step E4.

In a step E10, it is possible to examine the nature of the command which has just been sent. If it is not a movement command, it is possible to proceed directly to step E12 in which the device chooses the next control command to be proposed to the user. If it is a movement command, a step E11 is proceeded to, in which the control device chooses and displays for a predetermined duration D2, this duration D2 possibly being parametrizable, a stop command so that, in case of emergency, the user can validate and send this command rapidly. The control device not being informed of the end of the movement, this time D2 will be chosen to be greater than a standard actuation time for the home-automation appliance. Naturally, over this duration D2, the proposed command may be modified by the user who can immediately send the command that he has chosen. If, over the duration D2, the user has chosen to send the proposed stop command, or any other control command that he has chosen, then step E4 of sending the command is returned to. On completion of the duration D2, if the user has not chosen to send a stop command or any other command of his choice, we proceed to step E12 of choosing the next control command that the device proposes to send to the home-automation appliance, as in step E0. This new command may remain displayed on the display device for a predetermined duration D3 (step E13), before the control device places itself back on standby, this being so that the user can send this command fairly rapidly and restart the procedure directly at step E4, without going via the wakeup step. As described above, for the duration D3, the user has the possibility of modifying the proposed control command.

Figure 8:
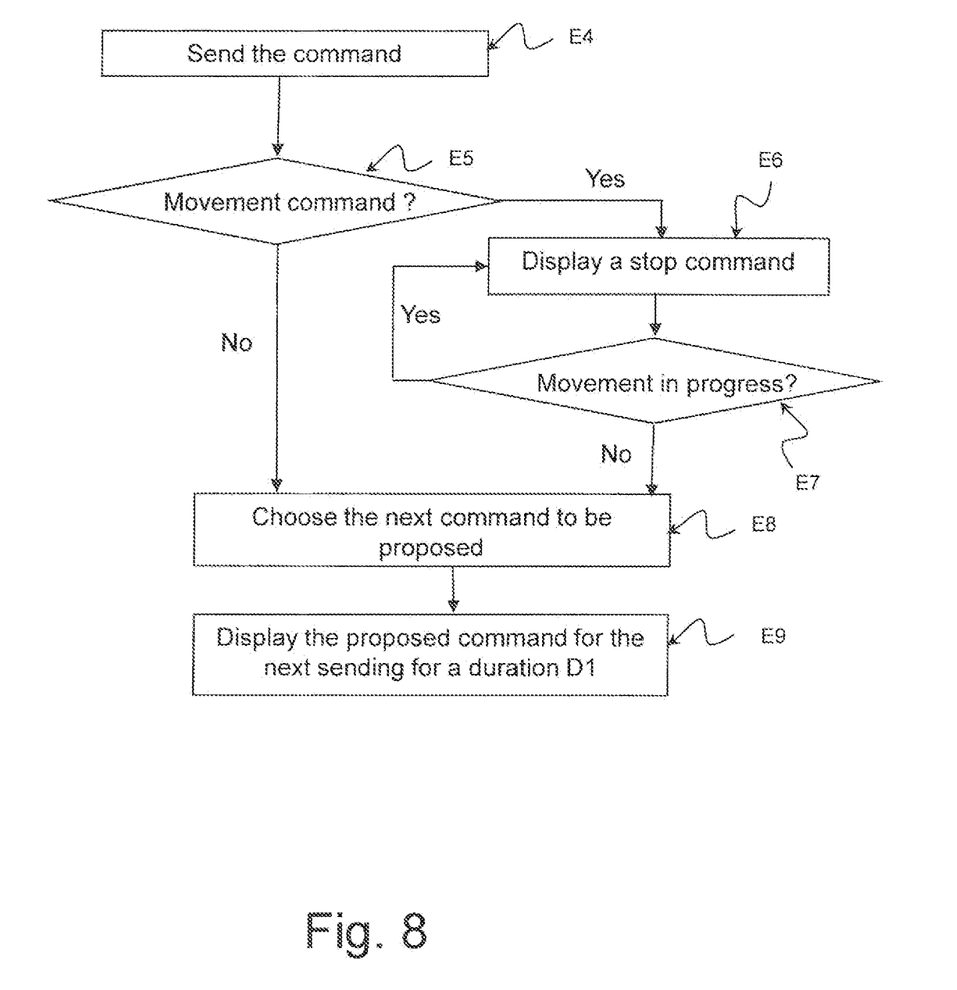
FIG. 8 is a flowchart of a second mode of execution of the method of operation according to the invention, for a bidirectional control device.
Figure 9:
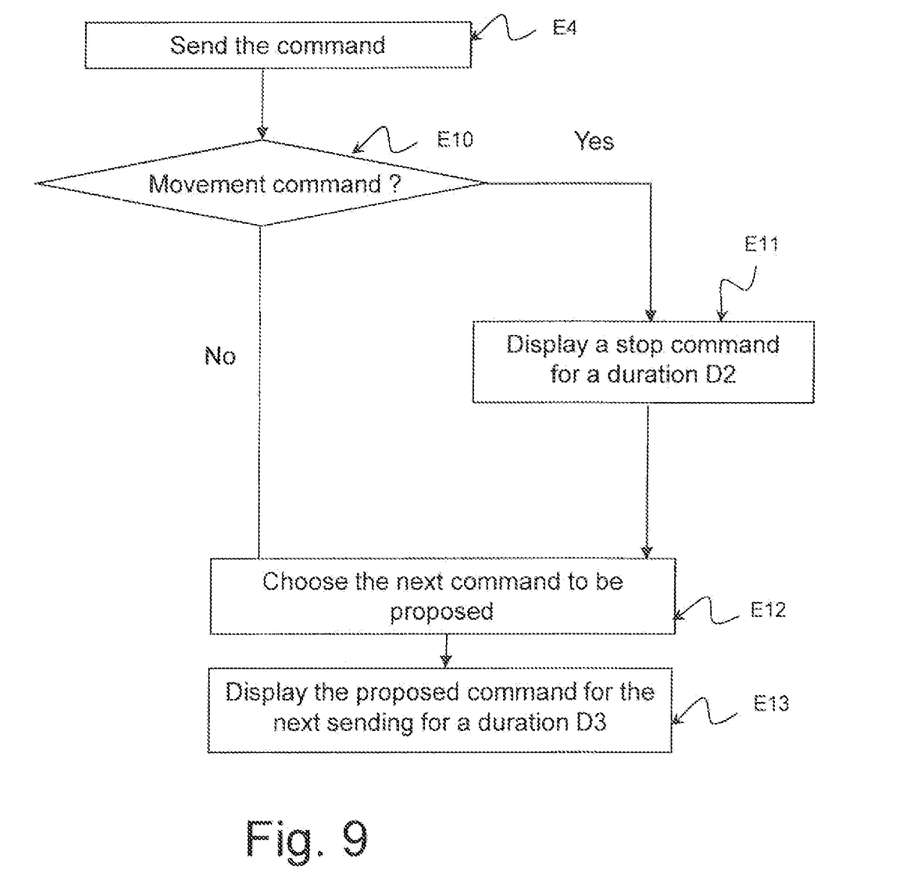
FIG. 9 is a flowchart of a third mode of execution of the method of operation according to the invention, for a monodirectional control device.

The steps described in FIGS. 8 and 9 are merely nonlimiting examples of what could be carried out by virtue of the invention.

Figure 10:
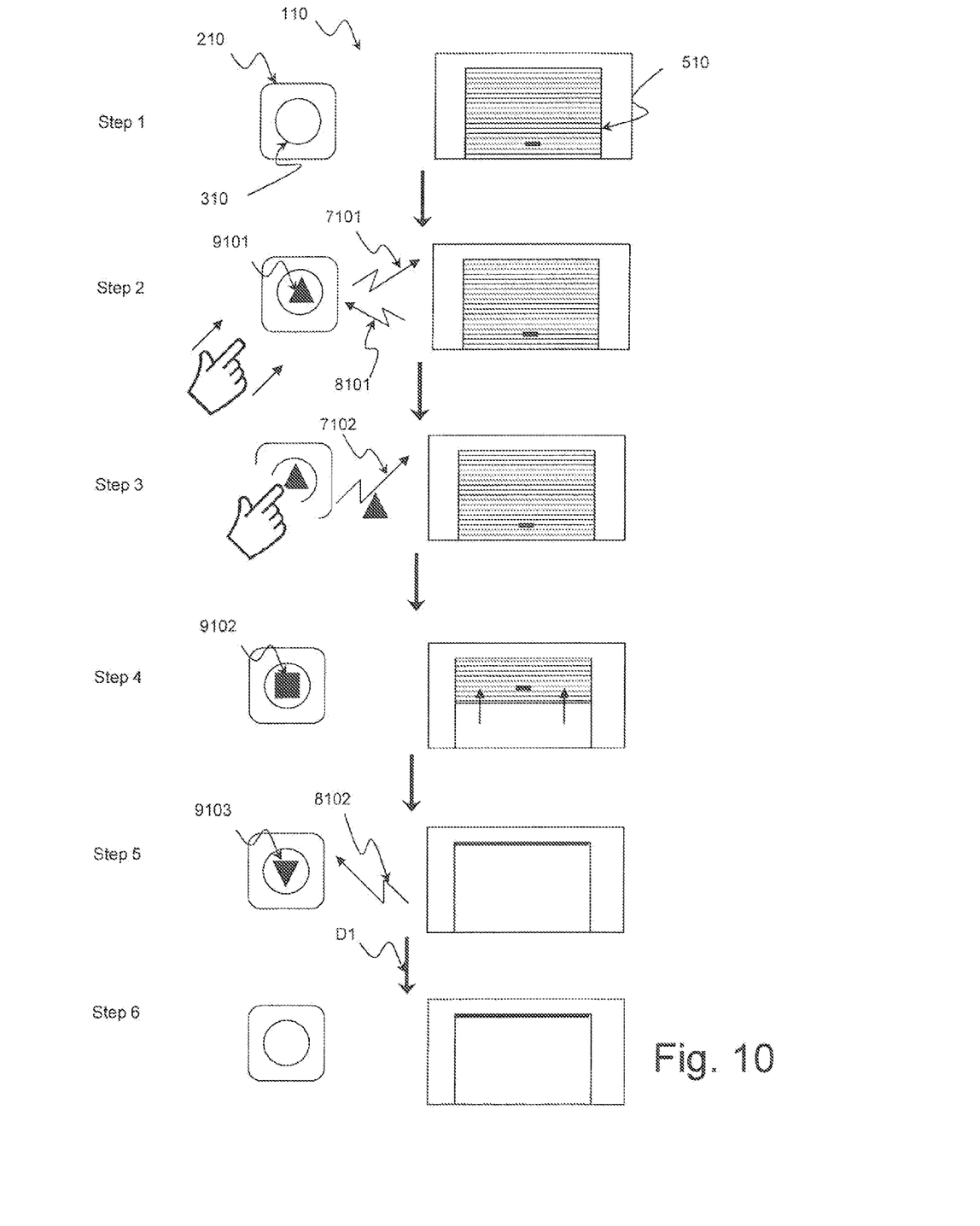
FIG. 10 illustrates the successive steps of a mode of execution of the method of operation according to the invention, and although the invention may be applied to any type of home-automation appliance network, it is described in its application to a motorized garage door controlled by a bidirectional radio remote control, fitted with a single button, which button is also the means for displaying the next command proposed.

FIG. 10 illustrates an exemplary implementation of the method of operation according to the invention, described by FIGS. 7 and 8.

The home-automation network 110 implements a bidirectional wireless remote control 210, fitted with a single button 310 equipped with a display device, and able to communicate with a motorized garage door 510.

Step 1 shows the installation when idle, in a state awaiting a next command. The door 510 is stationary, in the closed position, the remote control 210 does not send any signal, it is on standby, the button 310 does not display any information.

Step 2 illustrates the approach of the user's hand close to the button of the remote control 210; this approach causes wakeup of the remote control 210, the first reaction of which consists in asking the door what its actual state is in a frame 7101; the door responds that it is completely closed in its response frame 8101, and the remote control can then display, on the button 310, an element 9101 representative of the command that the remote control 210 proposes to send to the door 510. In this instance, in this example, it is an up command symbolized by an upward pointing arrow. During step 3, the user validates, for example by a brief press on the button 310, the proposed command represented by the element 9101, and the remote control 210 then sends a control frame 7102 containing the validated command, to the door 510. Once this frame 7102 has been sent by the remote control and received by the actuator, the door starts moving until it reaches its top rest as illustrated in step 4. During the movement of the door, the remote control can optionally display a stop command symbolized by a solid square 9102 so that the user can intervene rapidly if needed. Once the door has reached its top rest, it can inform the remote control thereof by sending an information feedback frame 8102 to it, as illustrated by step 5. The remote control can then choose the next control command that it will propose to the user for a predetermined duration D1, in the example, the remote control chooses the down command symbolized by a downward pointing arrow 9103; it could also "go back to sleep" immediately, and display the next command only the next time that it detects the approach of the user's hand or when the user presses the button 310 in the case where the remote control is not equipped with means for detecting the approach of the user's hand. On completion of the duration D1, the remote control 210 returns to an idle state in which no command is displayed any longer (step 6).

Figure 11:
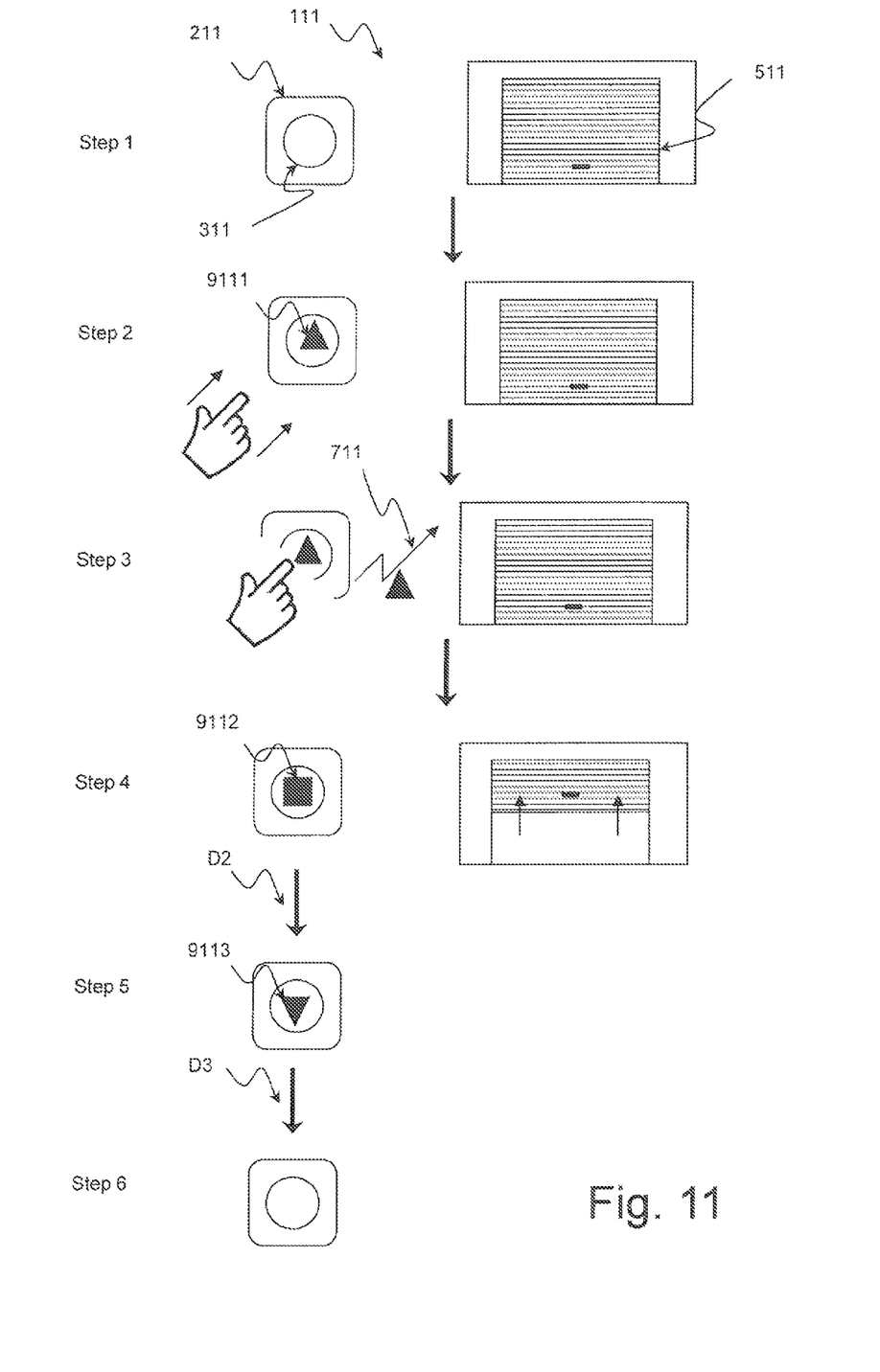
FIG. 11 illustrates the successive steps of a mode of execution of the method of operation according to the invention, applied to a unidirectional control device.

FIG. 11 illustrates an exemplary implementation of the method of operation according to the invention, described by FIGS. 7 and 9.

The home-automation network 111 implements a unidirectional wireless remote control 211, fitted with a single button 311 equipped with a display device, able to communicate with a motorized garage door 511.

Steps 1, 2 and 3 are identical to steps 1, 2, and 3 described in FIG. 10. The difference resides in the fact that this time the remote control is unidirectional, and therefore, it cannot receive any information frame from the door indicating that the movement or the required action has terminated. The optional step 4 consists in proposing a stop command, symbolized by an element 9112, to the user for a predefined duration D2. On completion of this time span, the remote control can then choose the next control command that it will propose to the user for a predetermined duration D3; in the example, the remote control chooses the down command 9113; it could also "go back to sleep" immediately, and display the next command only the next time that it detects the approach of the user's hand or when the user presses the button 310 in the case where the remote control is not equipped with means for detecting the approach of the user's hand. On completion of the duration D3, the remote control 210 returns to an idle state in which no command is displayed any longer (step 6).

In this document, "a step of selecting a possible control command from among a plurality of predefined control commands, that may be sent by the control device and at least one step of displaying the command selected by this control device" signifies "a step of selecting at least one possible control command from among a plurality of predefined control commands, that may be sent by the control device and at least one step of displaying the at least one command selected by this control device". However, the method preferably comprises the selecting of a single command and the displaying of this single command, thereby advantageously allowing the use of a display interface of reduced size while making it possible to display a symbol of sufficiently large size to facilitate its understanding by the user.

The command or commands selected do not comprise all the control commands executable by the home-automation appliance, in particular not all the commands executable by the home-automation appliance having regard to the present state of the home-automation appliance. The command or commands selected comprise the most relevant command or commands to be executed having regard to the current state of the home-automation appliance or the command or commands that it will most probably execute having regard to the current state of the home-automation appliance. The command or commands selected are so from among commands that are executable by the home-automation appliance and relevant to the actuator.

Thus, typically if the appliance is in the process of carrying out an action, the control command for this action is not selected (no need in fact, a priori, to instruct this action again). The same goes for the actions which cannot be executed by the home-automation appliance having regard to its state, for example an up command will not be selected by the control device if the appliance is already positioned at the top rest. On the other hand, for example, a command to interrupt an action may be selected during the execution of the action.

Furthermore, if the control device is capable, for example, of controlling a blind with orientable slats in a first mode of operation, and a garage door in a second mode of operation, it knows among others, slat tilting commands. If it is the garage door which is being instructed, that is to say the second mode of operation has been previously selected by the user, the selected command ought not to relate to the blind, in particular not to the tilting of the slats of the blind. Thus, if the control device is capable of controlling several home-automation appliances in various modes of operation, the command or commands selected by the control device relate solely to the home-automation appliance controlled in the mode of operation selected by the user.

As seen previously, the selection of at least one command is carried out by the control device itself.

As seen previously, the displaying of a control command may be carried out by displaying, on a screen, a symbol associated with a control button for this command or by displaying, on a touch screen, a symbol constituting a control button for this command.

The invention claimed is:

1. Method of operation of a device for controlling an electromechanically actuated home-automation appliance, wherein the method comprises the control device selecting a single proposed possible control command from among a plurality of predefined control commands that may be sent by the control device, and the control device displaying the single proposed command selected by the control device;
   wherein the device controls the electromechanically actuated movements of a mobile element of a home-automation appliance, the mobile element being selected from a closure device, a privacy device, a sun protection device, a screen device, a shutter, a roller blind, a door, and a gate for a building,
   wherein the control command selected and displayed by the control device is the next command that the control device proposes to send to the home-automation appliance.

2. Method of operation according to claim 1, wherein the method comprises modifying, according to a choice of a user, the command selected by the control device.

3. Method of operation according to the claim 2, wherein the modifying comprises a scrolling in a sequential manner of the plurality of the control commands that may be sent.

4. Method of operation according to claim 1, wherein the method comprises validating and sending the control command selected.

5. Method of operation according to claim 4, wherein the method comprises displaying a stop command subsequent to the validating and sending the control command selected.

6. Method of operation according operation of a device for controlling an electromechanically actuated home-automation appliance, wherein the method comprises the control device selecting a single proposed possible control command from among a plurality of predefined control commands that may be sent by the control device, and the control device displaying the single proposed command selected by the control device;
   wherein the device controls the electromechanically actuated movements of a mobile element of a home-automation appliance, the mobile element being selected from a closure device, a privacy device, a sun protection device, a screen device, a shutter, a roller blind, a door, and a gate for a building,
   wherein the selection of the command displayed by the control device results from an analysis of a log of previously sent commands or an analysis of an actual state of the home-automation appliance or a sequence of commands which is predefined by the user.

7. Method of operation according to claim 6, wherein the method comprises modifying, according to a choice of a user, the command selected by the control device.

8. Method of operation according to the claim 7, wherein the modifying comprises a scrolling in a sequential manner of the plurality of the control commands that may be sent.

9. Method of operation according to claim 6, wherein the method comprises validating and sending the control command selected.

10. Method of operation according to claim 9, wherein the method comprises displaying a stop command subsequent to the validating and sending the control command selected.

11. Control device for an electromechanically actuated home-automation appliance, wherein the device comprises hardware means and processing means configured to implement, when executed, the method of operation comprising:
    the control device selecting a single proposed possible control command from among a plurality of predefined control commands that may be sent by the control device, and the control device displaying the single proposed command selected by this control device;
    wherein the device controls electromechanically actuated movements of mobile element of a home-automation appliance, the mobile element being selected from a closure device, a privacy device, a sun protection device, a screen device, a shutter, a roller blind, a door, and a gate for a building,
    wherein the hardware means and processing means comprise a means for selecting a control command and at least one display device intended to display a symbol representing only the control command selected.

12. Control device according to claim 11, wherein the hardware means and processing means comprise a means for modifying the command selected.

13. Control device according to claim 12, wherein the hardware means and processing means comprise a means for sending the command selected.

14. Control device according to claim 12, wherein the hardware means comprises a key comprising the display device and the modifying means, this key being able, when it is activated, to trigger the sending of the control command.

15. Control device according to claim 11, wherein the hardware means and processing means comprise a means for sending the command selected.

16. Control device according to claim 11, wherein a first key comprises the display device and wherein at least one second key comprises at least one of the means for modifying or triggering the send of the control command.

17. Method of operation of a device for controlling an electromechanically echanically actuated home-automation appliance, wherein the method comprises the control device selecting a single proposed possible control command from among a plurality of predefined control commands that nay be sent by the control device, and the control device displaying the single proposed command selected by the control device;
    wherein the device controls the electromechanically actuated movements of a mobile element of a home-automation appliance, the mobile element being selected from a closure device, a privacy device, a sun protection device, a screen device, a shutter, a roller blind, a door, and a gate for a building,
    wherein the method comprises displaying only the single proposed command.

18. Method of operation according to claim 17, wherein the method comprises modifying, according to a choice of a user, the command selected by the control device.

19. Method of operation according to the claim 18, wherein the modifying comprises a scrolling in a sequential manner of the plurality of the control commands that may be sent.

20. Method of operation according to claim 17, wherein the method comprises validating and sending the control command selected.

21. Method of operation according to claim 20, wherein the method comprises displaying a stop command subsequent to the validating and sending the control command selected.

* * * * *

UNITED STATES PATENT AND TRADEMARK OFFICE
CERTIFICATE OF CORRECTION

| | | |
|---|---|---|
| PATENT NO. | : 8,972,030 B2 | |
| APPLICATION NO. | : 13/407276 | |
| DATED | : March 3, 2015 | |
| INVENTOR(S) | : Pierre-Emmanuel Cavarec and Pierre Mignot | |

It is certified that error appears in the above-identified patent and that said Letters Patent is hereby corrected as shown below:

In the Claims:

Claim 6, line 1 (Column 12, line 7) "according operation" should be deleted;

Claim 17, line 5 (Column 13, line 12) the word "nay" should be changed to --may--.

Signed and Sealed this
Fifth Day of April, 2016

Michelle K. Lee
*Director of the United States Patent and Trademark Office*